3,392,182
NOVEL ORGANOSILICON COMPOUNDS AND PROCESS FOR THEIR PREPARATION
Götz Koerner, Mulheim (Ruhr), Germany, assignor to Th. Goldschmidt A.G., Essen, Germany
No Drawing. Filed Feb. 12, 1964, Ser. No. 344,217
Claims priority, application Germany, Feb. 28, 1963, G 37,173
11 Claims. (Cl. 260—448.8)

ABSTRACT OF THE DISCLOSURE

Thioether group containing silanes and siloxanes wherein the sulfur atom is linked to the silicon atom through at least 3 carbon atoms.

The silanes correspond to the general formula $$R_b(R'O)_aSi-M-S-(CH_2)_2-x$$

wherein M is alkylene linking the Si and S of the formula through three carbon atoms;
R and R' are each alkyl of from 1 to 6 carbon atoms, phenyl or benzyl;
$a$ and $b$ are each one of 0, 1, 2 and 3, $a+b$ being equal to 3; and
X is $$-\underset{\underset{H}{|}}{C}=O, \quad -\underset{\underset{O}{\|}}{C}-CH_3 \text{ or } -O-\underset{\underset{O}{\|}}{C}-R \text{ or } C_6H_5$$

The siloxanes are of the general formula $$R_n(OR')_mSi[MS(CH_2)_2X]_vO_2-\frac{n+m+v}{2}$$

wherein M is alkylene linking the Si and S of the formula through three carbon atoms;
R and R' are each alkyl of from 1 to 6 carbon atoms, phenyl or benzyl;
X is $$-\underset{\underset{H}{|}}{C}=O, \quad -\underset{\underset{O}{\|}}{C}-CH_3 \text{ or } -O-\underset{\underset{O}{\|}}{C}-R, \text{ or } C_6H_5$$

$n$ and $m$ are each numbers between 0 to 3;
$v$ is a value between 0.001 and 1, the sum $n+m+v$ having a value between 1 and 3.

The application also discloses a process for preparing the novel silanes and siloxanes wherein a compound having an olefinic double bond and in the presence of an addition inducing catalyst is reacted with an organosilicon mercaptan selected from the group consisting of
(a) a compound of the formula $$R_b(R'O)_aSi-MSH$$

wherein M is alkylene linking Si and S of the formula through three carbon atoms;
R and R' are each alkyl of from 1 to 6 carbon atoms, phenyl or benzyl;
$a$ and $b$ are each one of 0, 1, 2 and 3, $a+b$ being equal to 3; and
(b) a compound of the formula $$R_n(R'O)_mSi(MSH)_vO_2-\frac{n+m+v}{2}$$

where R, R' and M have the above indicated meaning, $n$ and $m$ are each numbers between 0 and 3, and $v$ is a value between 0.001 and 1, the sum $n+m+v$ having a value between 1 and 3.

The novel compounds improve the bonding characteristics of glass fibers to synthetic resins and the like plastics.

The novel compounds are also suitable for protecting metal surfaces and may be used in the cosmetic industry, particularly in hair preparations.

---

This invention generally relates to organosilicon compounds and is particularly concerned with novel thioether-group-containing silanes and siloxanes, wherein the sulphur atom is linked to the silicon atom through at least three carbon atoms, and a process for preparing such novel silanes and siloxanes.

It has previously been suggested to perform addition reactions between mercapto-group-containing compounds and compounds having olefinic double bonds. However, the addition of mercaptans, wherein the mercapto group is linked to a silicon atom through an alkylene group to compounds having olefinic double bonds has not previously been suggested in the literature.

It has now surprisingly been ascertained that compounds which contain the structural unit $\equiv Si-M-S-R$ in which M is an alkylene which links the silicon and sulphur atoms through at least three carbon atoms and R is hydrocarbon, possess valuable and beneficial characteristics. Such compounds are therefore useful for many purposes and may be successfully employed in, for example, glass fiber finishing preparations, in preparations for protecting metal surfaces and for cosmetic purposes.

Accordingly, it is a primary object of this invention to provide novel silanes and siloxanes which can be used for a wide variety of purposes.

Another object of this invention is to provide a process for preparing such novel silanes and siloxanes which is simple to carry out and results in high yields.

Generally, it is an object of this invention to improve on the art of silanes and siloxanes as presently practiced.

Briefly and in accordance with this invention, the novel organosilicon compounds are prepared in a simple and smooth manner by reacting a compound containing an olefinic double bond with either an organosilicon mercaptan of the general formula $$R_b(R'O)_aSi-MSH$$

or with a mercaptan of the general formula $$R_n(R'O)_mSi(MSH)_vO_2-\frac{n+m+v}{2}$$

In these formulas M is alkylene which links the silicon atom and the sulphur atom through at least three carbon atoms. Thus, propylene, butylene and isopropylene are embraced by M;
R and R' stand each for lower alkyl, phenyl or benzyl. Lower alkyl in the context of this application refers to alkyl of 1 to 6 carbon atoms;
$a$ and $b$ designate each any suitable number between 0–3, inclusive;
$n$ and $m$ are each numbers between 0 to 3;
$v$ is any suitable number between 0.001–1, the sum of $n+m+v$ having a value of between 1 and 3. A preferred range for $v$ is 0.01–1.

The reaction between the compound having the olefinic double bond and the organosilicon mercaptan is performed in the presence of an addition catalyst known per se.

Organosilicon mercaptans of the above indicated formulas are disclosed in the copending U.S. patent application 277,680, now Patent No. 3,314,982, and may be prepared in the manner disclosed in said U.S. application, i.e., they may be obtained by alkaline cleavage of the corresponding isothiuronium salt.

Preferred compounds obtained according to the inventive reaction are e.g. silanes of the general formula

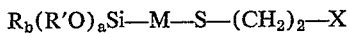

or siloxanes according to the formula

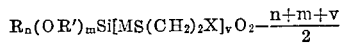

wherein X is selected from the group consisting of

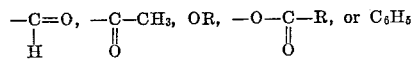

the other symbols having the above indicated meaning.

A large variety of compounds containing the olefinic double bond may be employed. Preferred compounds are, however, those which contain a vinyl or allyl group. Examples for such compounds are the following:

Vinylchloride, vinylcyanide, vinylacetate, vinylidenechloride, vinylidenecyanide, vinylethers, acrylates, methacrylates, allylchloride, allylacetate, allylamine, allylalcohol, allylglycide-ether, allylmethacrylate, acrolein or styrene.

As previously mentioned, the inventive reaction is carried out in the presence of a known catalyst which induces addition reactions. Such catalysts are for example organic peroxides, such as benzoylperoxide, tertiary butylperbenzoate and the like.

The addition reaction may also be catalyzed by an admixture of other radical forming agents as for example azo-diisobutyricacidnitrile. Further, the inventive reaction can be successfully carried out in the presence of tertiary amines such as triethylamine or triethylenediamine. A number of Lewis acids, as for example, borontrifluoride are also suitable for the inventive purpose. It has also been ascertained that heavy metal salts, as for example, copper-II-acetate are suitable catalysts. Moreover, the addition reaction can be initiated by radiation.

In many instances it is recommended to perform the inventive reaction at elevated temperatures, for example, in a temperature range of between about 30°–200° C. However, if the olefinic component to be reacted with the mercapto compound is particularly reactive, it is advantageous to control the reaction course by suitable cooling so as to maintain the temperature at a level of about +30° to −50° C.

Experience has demonstrated that for the purpose of avoiding polymerization or telomerization, it is advantageous to add the olefinic component to the mercaptan-catalyst mixture in dropwise manner. In this manner, the reaction can be more readily controlled.

Another embodiment of the inventive process resides in first mixing the olefinic and the mercaptan containing components and thereafter adding the mixture thus obtained to the catalyst in dropwise manner. In some instances it is advantageous to perform the reaction in the presence of a suitable solvent.

Such thioether-group-containing silanes of Formula a

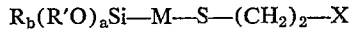

or siloxanes of Formula b

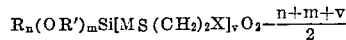

wherein

M is alkylene linking the Si and S of the formula through at least three carbon atoms;

R and R' are each selected from the group consisting of alkyl of from 1 to 6 carbon atoms, phenyl and benzyl;

$a$ and $b$ are each one of 0, 1, 2 and 3, $a+b$ being equal to 3;

$n$ and $m$ are each numbers between 0 to 3;

$v$ is a value between 0.001 and 1; and

X is selected from the group consisting of

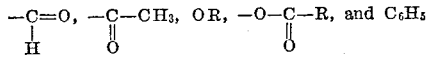

can be hydrolysed alone or together with silanes or mixtures of silanes of the formula $R_nSiX_{4-n}$ wherein n is 0–4; R is a lower alkyl with 1–6 C-atoms and X is a halogen or OR.

The resulting products may be equilibrated as well-known in the art.

As previously mentioned, the inventive compounds find use in many branches of technology. Thus, for example, it has conclusively been established that the inventive compounds significantly improve the bonding characteristics of glass fibers to synthetic resins and the like plastics. If glass fibers are impregnated with the inventive products, synthetic resins with which the glass fibers are thereafter coated will adhere in a much improved manner to the glas fibers thus treated than to an untreated glass fiber. The inventive products may be used for the indicated purpose both in monomeric and also in polymeric form. The monomeric products are readily converted on the fibers into polymeric products by hydrolysis and condensation.

The reaction products of the organosilicon mercaptans and allylamine or allylglcideether are particularly suitable for increasing the bonding characteristics between glass fibers and epoxy resins. By contrast, the reaction products of the organosilicon mercaptans and acrolein or allylmethacrylate yield superior results if glass fibers impregnated with such reaction products are subsequently coated with polyester resins.

The inventive compounds are also eminently suitable for protecting metal surfaces. Due to the presence of the Si—M—S—R group, such compounds adhere readily to various metals, as for example, silver and thus provide excellent protection against surface attacks.

The inventive compounds find also use in the cosmetic industry, particularly in hair preparations.

The invention will now be described by several examples, it being understood, however, that these examples are given by way of illustration and not by way of limitation and that many changes may be effected in the choice of starting materials and process conditions in general without affecting in any way the scope and spirit of the invention as recited in the appended claims.

Example I.—Preparation of ω-methyldiethoxy-silyl-4-thiaheptanal 56 grams (1 mole) of acrolein, which was stabilized with hydroquinone, and 0.5 gram of copper-II-acetate were mixed in a three-neck flask fitted with a stirrer, reflux cooler and drop funnel. The drop funnel was charged with 208 grams (1 mole) of γ-mercaptopropylmethyldiethoxysilane. The silane compound was then added under agitation and cooling to the mixture in the flask at such a speed that the temperature of the reaction mixtures was maintained at about 35° to 40° C. After the silane had been completely added to the mixture in the flask, the reaction mixture thus obtained was allowed to react for an additional hour at 37° C. The reaction mixture was thereafter subjected to fractional distillation.

B.P.$_{0.1}$ 120–130° C. yield 180 grams, which corresponds to 68% of the theoretical amount. A strong band can be observed in the IR-spectrum at 1740 cm.$^{-1}$ which corresponds to the C=O wave of the aldehydes.

*Analysis.*—Calculated: Mole weight, 264; Si, 10.6; S, 12.1; C, 50.0; H, 9.1; OC$_2$H$_5$, 34.1. Found: Mole weight, 275; Si, 10.4; S, 11.9; C, 49.5; H, 9.2; OC$_2$H$_5$, 33.5.

Example II.—Preparation of 3-(2-cyanoethyl-mercapto)-propyl-methyl-diethoxy-silane 104.4 grams of γ-mercaptopropylmethyldiethoxysilane, which corresponds to 0.5 mole, were dissolved in 200 cm.$^3$ of ethanol containing 1 gram of sodium ethylate. 26.5 grams of acrylonitrile, corresponding to 0.5 mole, were added to the mixture in dropwise manner under stirring and cooling. The temperature of the reaction mixture was maintained in a range of −3° C. to +5° C. The mixture was thereafter left to stand for an additional 1.5 hours at 0° C.

The reaction product was distilled.

B.P.$_{0.3}$ 130–137° C., yield 90 grams corresponding to 68.7% of theoretical amount.

*Analysis.*—Calculated: Si, 10.73%; C, 50.60%; H, 8.82%; S, 12.26%; N, 5.37%. Found: Si, 10.7%; C, 49.8%; H, 8.9%; S, 12.9%; N, 4.9%.

Example III.—Preparation of 3-(2-phenylethyl-mercapto)-propylmethyl-diethoxy-silane A mixture of 104.4 grams of γ-mercapto-propylmethyl-diethoxysilane, corresponding to 0.5 mole, and 52.1 of styrene, correspoonding to 0.5 mole, is prepared. This mixture is added in dropwise manner under agitation to 1.5 grams of benzoylperoxide dissolved in 20 cm.³ of benzene. The addition of the mixture to the catalyst solution is terminated within about 15 minutes and is effected at room temperature. The reaction mixture thus obtained is allowed further to react for one hour at room temperature and for an additional three hours at 130° C. bath temperature. The reaction product is then distilled.

B.P.$_{0.2}$ 140—145° C.; yield 85 grams (54.3% of the theory).

*Analysis.*—Calculated: Si, 9.87%; C, 61.55% H, 8.79%; S, 10.5%. Found: Si, 8.55%; C, 62.0%; H, 9.4%; S, 10.28%.

Example IV.—Preparation of 3-(2-cyanoethyl-mercapto)-2-methylpropyltriethoxysilane 126 grams of γ-mercapto-β-methylpropyltriethoxysilane (0.5 mole) were dissolved in 200 grams of ethanol containing 1 gram of sodium ethylate. 26.5 grams of acrylonitrile (0.5 mole) were added to this mixture in dropwise manner. The addition of the nitrile compound is performed under agitation and cooling so as to obtain a temperature in the reaction mixture of between 0° to +5° C. The reaction mixture was allowed to further react for 1.5 hours and 0° C. The reaction product was then removed by distillation.

B.P.$_{0.2}$ 148–155° C.; yield 84 grams (55% of the theoretical amount).

*Analysis.*—(SiC$_{13}$H$_{27}$NO$_3$S). Calculated: Si, 9.18%; C, 51.15%; H, 8.85%; N, 4.59%; S, 10.49%. Found: Si, 8.8%; C, 50.5%; H, 9.3%; N, 4.9%; S, 10.3%.

Example V.—Preparation of γ-(β-acetoxyethylmercapto) propylmethyldiethoxysilane

A mixture of 20.8 grams (0.1 mole) or γ-mercaptopropylmethyldiethoxysilane and 8.6 grams (0.1 mole) of vinylacetate (freshly distilled) was prepared. 10% of this mixture was added to 0.4 gram of benzoylperoxide. The remainder of the mixture was added to the benzoylperoxide in dropwise manner within a period of 4 hours at a temperature of 94° C. under reflux and agitation. The reaction mixture thus obtained was allowed further to react for 3 days at 110° C. The reaction was carried out in a nitrogen atmosphere. The reaction product was distilled. B.P.$_{0.2}$ 110–114° C. Yield 14.0 grams (47% of the theoretical amount).

*Analysis.*—Calculated: Si, 9.54; C, 48.9; H, 8.84; S, 11.7; OC$_2$H$_5$, 30.7; MG, 294. Found: Si, 9.7; C, 48.4; H, 8.9; S, 11.7; OC$_2$H$_5$, 30.8; MG, 285.

Example VI.—Preparation of a polysiloxane of the formula

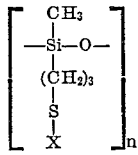

wherein X stands for

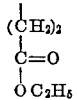

First a polysiloxane of the above formula wherein X is H was prepared by hydrolysing γ-mercapto-propyl-methyl-diethoxy-silane:

208 grams (1 mole) of γ-mercapto-propyl-methyl-diethoxy-silane were added to 400 cm.³ of 5 percent hydrochloric acid in dropwise manner within a period of 2 hours. The reaction mixture was heated to 80° C. under further agitation. The oil phase was separated, washed—first with distilled water then with a saturated solution of NaHCO$_3$—and was dried with toluol by means of an aceotropic distillation. After removing the toluol by distillation 129 grams (96.3% of the theoretical amount) of γ-mercapto-propyl-methyl-polysiloxane were obtained. (Viscosity: 85 cps.).

67 grams of this polysiloxane were mixed with 1.12 grams (0.01 mole) of triethylene diamine and were heated to 40° C. in a three-necked flask under a weak flow of nitrogen containing no oxygen. 50 grams (0.5 mole) of acrylic acid ethylester were then added in dropwise manner while stirring so that the temperature in the three-necked flask did not exceed 50° C. The reaction mixture was thereafter stirred for an additional hour at a temperature of 50° C. No acrylic acid ester could be removed by distillation from the reaction product, even not at bath temperature up to 180° C. under reduced pressure. Yield 116 grams (99.2% of the theoretical amount).

*Analysis.*—Calculated: Si, 11.96; C, 46.16; H, 7.69; S, 13.67. Found: Si, 11.3; C, 45.9; H, 7.4; S, 13.8.

(Viscosity: 318 cps.).

Example VII

Preparation of a polysiloxane corresponding to the formula of Example VI wherein X stands for

67 grams of a polysiloxane corresponding to the formula of Example VI wherein X stands for H obtained according to Example VI were mixed with a solution of 1 gram of sodium ethylate in 200 cm³. ethanol and this reaction mixture was cooled to 0° C. 29.2 grams (0.55 mole) of acrylonitrile were then added in dropwise manner in a nitrogen atmosphere at a temperature of 0 to +5° C. The reaction mixture was heated to room temperature and was then left to stand over night. The sodium ethylate was neutralized with hydrochloric acid, the ethanol and the excess of acrylonitrile were distilled off in vacuum and the residue was filtered. Yield 87 grams (93% of the theoretical amount).

*Analysis.*—Calculated: Si, 14.97; C, 44.92; H, 6.95; S, 17.12; N, 7.49. Found: Si, 15.2; C, 43.8; H, 6.7; S, 17.8; N, 6.9.

The IR-spectrum of this silicon oil is nearly identical with the IR-spectrum of an oil obtained by a hydrolysis of 3 - (2 - cyanoethyl - mercapto) - propyl - methyl-diethoxysilane (Example II) according to Example VI.

Example VIII

Cohydrolysis of 3 - (2 - cyanoethyl - mercapto) - propyl-methyl - diethoxysilane, trimethylchlorosilane and dimethyldichlorosilane.

2.2 grams (0.02 mole) of trimethylchlorosilane, 38.7 grams (0.3 mole) of dimethyldichlorosilane and 13.1 grams (0.05 mole) of 3 - cyanoethyl - mercapto)-propyl - methyl - diethoxysilane (Example II) were mixed. This mixture was added to 100 cm.³ of 2 percent hydrochloric acid in dropwise manner under agitation and cooling and was then further stirred over night. The oil was separated, dried over CaCl$_2$ and filtered.

Yield 28.5 grams (86.1% of the theoretical amount).
*Analysis.*—Calculated: S, 5.38; N, 2.11. Found: S, 5.5; N, 2.3.

The cohydrolysate obtained corresponded to the average formula:

$$(CH_3)_3Si-O-\left[\begin{array}{c}CH_3\\|\\Si-O\\|\\CH_3\end{array}\right]_{30}\left[\begin{array}{c}CH_3\\|\\Si-O\\|\\(CH_2)_3\\|\\S\\|\\(CH_2)_2\\|\\CN\end{array}\right]_5-Si(CH_3)_3$$

While specific embodiments of the invention have been shown and described in detail to illustrate the application of the inventive principles, it will be understood that the invention may be embodied otherwise without departing from such principles.

What is claimed is:

1. Silanes of the general formula $$R_b(R'O)_aSi-M-S-(CH_2)_2-X$$

wherein M is alkylene linking the Si and S of the formula through three carbon atoms;
R and R' are each selected from the group consisting of alkyl of from 1 to 6 carbon atoms, phenyl and benzyl;
$a$ and $b$ are each one of 0, 1, 2 and 3, $a+b$ being equal to 3; and
X is selected from the group consisting of $$-\underset{\underset{H}{|}}{C}=O,\ -\underset{\underset{O}{\|}}{C}-CH_3,\ OR,\ -O-\underset{\underset{O}{\|}}{C}-R,\ \text{and}\ C_6H_5$$

2. Siloxanes of the general formula $$R_n(OR')_mSi[MS(CH_2)_2X]_vO_{2-\frac{n+m+v}{2}}$$

wherein M is alkylene linking the Si and S of the formula through three carbon atoms;
R and R' are each selected from the group consisting of alkyl of from 1 to 6 carbon atoms, phenyl and benzyl;
X is selected from the group consisting of $$-\underset{\underset{H}{|}}{C}=O,\ -\underset{\underset{O}{\|}}{C}-CH_3,\ OR,\ -O-\underset{\underset{O}{\|}}{C}-R,\ \text{and}\ C_6H_5$$

$n$ and $m$ are each numbers between 0 to 3;
$v$ is a value between 0.001 and 1, the sum $n+m+v$ having a value between 1 and 3.

3. Silanes of the general formula $$R_b(R'O)_aSi-M-S-(CH_2)_2-X$$

wherein M is selected from the group consisting of propylene, butylene and isopropylene;
R and R' are each selected from the group consisting of alkyl of from 1 to 6 carbon atoms, phenyl and benzyl;
$a$ and $b$ are each one of 0, 1, 2 and 3, $a+b$ being equal to 3 and
X is selected from the group consisting of $$-\underset{\underset{H}{|}}{C}=O,\ -\underset{\underset{O}{\|}}{C}-CH_3,\ OR,\ -O-\underset{\underset{O}{\|}}{C}-R,\ \text{and}\ C_6H_5$$

4. Siloxanes of the general formula $$R_n(OR')_mSi[MS(CH_2)_2X]_vO_{2-\frac{n+m+v}{2}}$$

wherein M is selected from the group consisting of propylene and isopropylene;
R and R' are each selected from the group consisting of alkyl of from 1 to 6 carbon atoms, phenyl and benzyl; and
X is selected from the group consisting of $$-\underset{\underset{H}{|}}{C}=O,\ -\underset{\underset{O}{\|}}{C}-CH_3,\ OR,\ -O-\underset{\underset{O}{\|}}{C}-R,\ \text{and}\ C_6H_5$$

$n$ and $m$ are each numbers between 0 to 3
and $v$ is a value between 0.001 and 1, the sum $n+m+v$ having a value between 1 and 3.

5. ω-Methyldiethoxysilyl-4-thiaheptanal.
6. 3-(2-cyanoethyl-mercapto)-propyl-methyldiethoxy-silane.
7. 3-(2-phenylethyl-mercapto)-propyl-methyldiethoxy-silane.
8. 3-(2-cyanoethyl-mercapto)-2-methyl-propyl-triethoxy-silane.
9. γ-(β-acetoxyethyl-mercapto)-propyl-methyldiethoxy-silane.
10. A polysiloxane of the formula $$\left[\begin{array}{c}CH_3\\|\\-Si-O-\\|\\(CH_2)_3\\|\\S\\|\\(CH_2)_2\\|\\C=O\\|\\OR\end{array}\right]_n$$

wherein $n$ is a number greater than 3; R is ethyl, and the viscosity is about 318 cps.

11. A polysiloxane of the average formula $$(CH_3)_3Si-O-\left[\begin{array}{c}CH_3\\|\\Si-O\\|\\CH_3\end{array}\right]_n\left[\begin{array}{c}CH_3\\|\\Si-O\\|\\(CH_2)_3\\|\\S\\|\\(CH_2)_2\\|\\CN\end{array}\right]_m-Si(CH_3)_3$$

wherein $n$ has the average value of 30 and $m$ has the average value of 5.

References Cited

UNITED STATES PATENTS

| | | | |
|---|---|---|---|
| 3,305,573 | 2/1967 | Molt et al. | 260—448.8 |
| 3,314,982 | 4/1967 | Koerner et al. | 260—448.2 |
| 2,583,322 | 1/1952 | Burkhard | 260—448.2 |
| 2,960,492 | 11/1960 | Morton et al. | 260—448.2 |
| 2,967,192 | 1/1961 | Kantor | 260—448.2 |

TOBIAS E. LEVOW, *Primary Examiner.*
HELEN M. McCARTHY, *Examiner.*
P. F. SHAVER, *Assistant Examiner.*